Patented Mar. 10, 1953

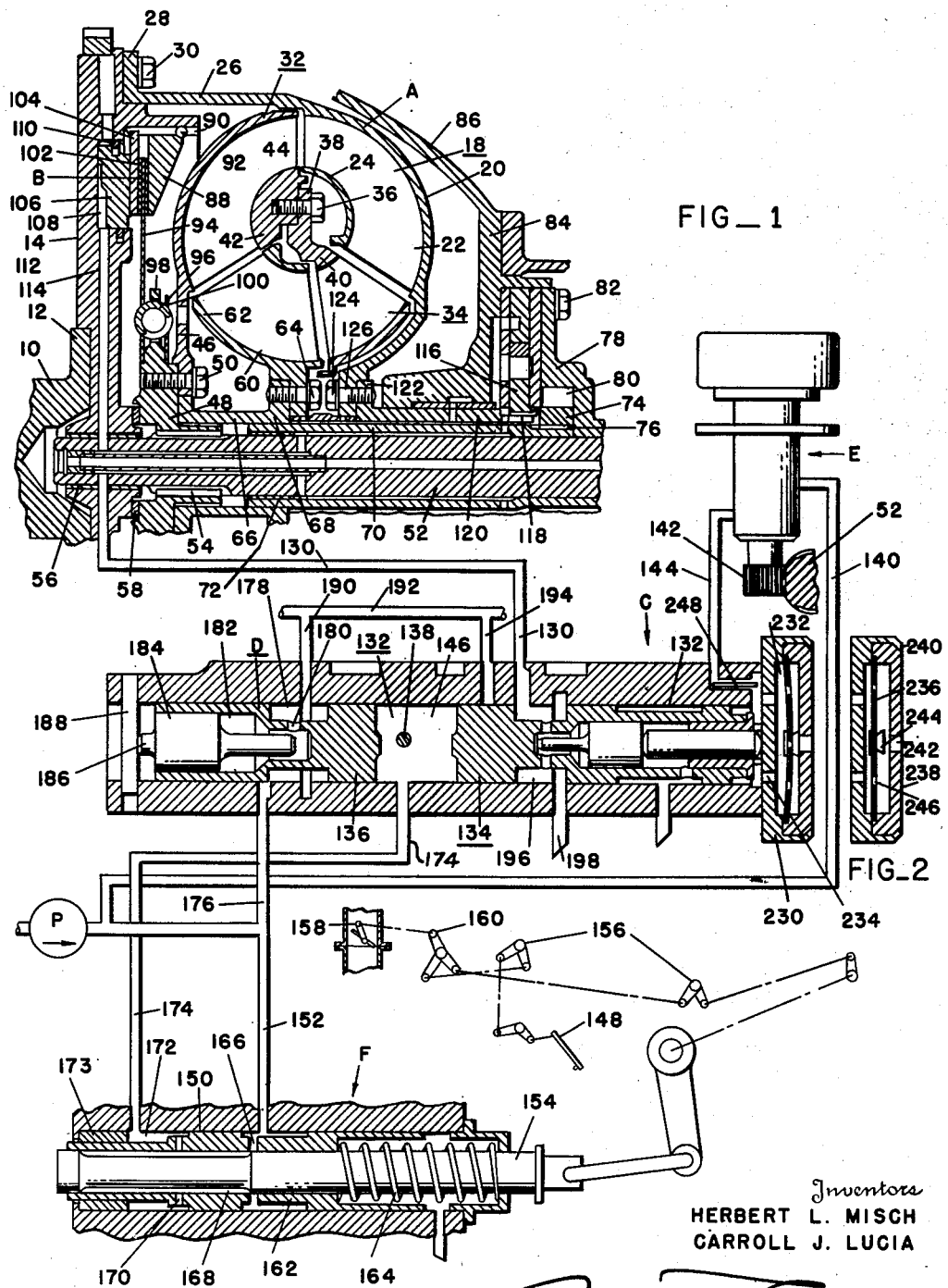

2,630,893

UNITED STATES PATENT OFFICE 2,630,893

TRANSMISSION

Herbert L. Misch, Royal Oak, and Carroll J. Lucia, Birmingham, Mich., assignors to Packard Motor Car Company, Detroit, Mich., a corporation of Michigan Application March 7, 1950, Serial No. 148,024

11 Claims. (Cl. 192—.033)

This invention relates to transmissions of the type having a torque multiplying mechanism for starting and accelerating a vehicle, and a higher speed ratio drive for operation at higher speeds. More particularly the invention is directed to means for delaying the engagement of the higher speed ratio drive until the fluid which operates it is in condition to insure satisfactory disengagement of the higher speed ratio drive without stalling of the engine.

In transmissions of the type having torque multiplying and higher speed ratio drives, such for example as a fluid torque converter for starting and accelerating a vehicle, and a fluid pressure actuated direct drive clutch for higher speed operation, engine stalling has been encountered due to sluggish disengagement of the direct drive clutch in stopping or slowing down the vehicle. At low temperatures the oil employed to engage the direct drive clutch flows more slowly than when it is heated to a higher temperature. The passages through which the oil flows to engage the direct drive clutch are sufficient to permit the rapid escape of oil to induce satisfactory clutch disengagement when the oil is heated to a degree sufficient to permit it to flow rapidly. When the oil is cold it flows more slowly and therefore induces a drag on the engine which may cause engine stalling.

In the operation of transmissions of this type fluid is circulated by a pump from an oil sump through the torque converter and back to the sump when the torque converter is operating to transmit power with an increase in torque. Since torque is thus transmitted through the fluid the latter heats up fairly rapidly.

We have found that satisfactory disengagement of the clutch may be obtained by preventing engagement thereof, and the latter accomplished by venting the fluid line thus by-passing the operating fluid in the system around the clutch until the torque converter has had time to heat the fluid to a free flowing temperature. In the present construction the venting or delaying of engagement is controlled by a temperature responsive venting device arranged in the path of the fluid from the converter to the clutch control valve.

An object of this invention is therefore to provide a means for delaying the engagement of a high speed ratio drive such as a direct drive clutch when the temperature of the operating fluid is below a substantially predetermined temperature.

A further object of the invention resides in the provision of a temperature responsive venting mechanism for disabling a valve controlling a direct drive clutch until the temperature of the operating fluid attains a substantially predetermined degree.

Another object of the invention is to provide a temperature responsive control for a direct drive clutch whereby the engagement of the clutch is delayed until the temperature of the operating fluid is sufficiently high that disengagement of the clutch can readily occur with no "hanging on" or dragging sensation.

Still a further object of the invention is to position a temperature responsive element in the fluid circuit of a control valve to prevent fluid pressure from being exerted on the valve until the fluid attains a substantially predetermined operating temperature.

A more specific object of the invention resides in the provision of a temperature responsive valve interposed between a source of fluid pressure and a control valve to delay application of pressure to the control valve until the temperature of the fluid reaches a substantially predetermined degree, the temperature responsive member being bathed in the fluid from said source to respond quickly to variations in temperature of the fluid.

Other objects and advantages of this invention will be apparent from the following detailed description, considered in connection with the accompanying drawings, wherein similar reference characters designate similar parts throughout the several views, and wherein:

Fig. 1 is a diagrammatic sectional view illustrating a transmission embodying our invention.

Fig. 2 is a fragmentary sectional view illustrating the venting valve in the venting position.

Before explaining in detail the present invention it is to be understood that the invention is not limited in its application to the details of construction and arrangement of parts illustrated in the accompanying drawings, since the invention is capable of other embodiments and of being practiced or carried out in various ways. Also it is to be understood that the phraseology or terminology employed herein is for the purpose of description and not of limitation.

Referring now more particularly to Fig. 1 it will be noted that an engine crankshaft or driving shaft 10 is provided with a flange 12 which supports a flywheel 14 in the form of a disk secured thereto in any convenient manner as by screws.

A torque converter A is provided with a fluid energizing impeller 18, having an outer shell 20 including fluid deflecting vanes 22 interposed between the shell and an inner shroud 24. The outer shell 20 is provided with a cylindrical extension 26 terminating in a flange 28 adapted to be secured to the flywheel 14 as by screws 30. An energy absorbing turbine is associated with the impeller 18, and is provided with a first stage section 32 having an inlet adapted to be positioned adjacent the outlet from the impeller 18, and a second stage 34 adapted to be positioned adjacent the inlet to the impeller. The first and second stage turbine members 32 and 34 may be secured together in any suitable manner as by screws 36 projecting through a flange 38 carried by the inner shroud 40 of the second stage turbine 34 and extending into a boss 42 carried by the inner shroud 44 of the first stage turbine 32. It will of course be understood that the first and second stage turbine members may be secured together in any other convenient manner.

The first stage turbine 32 is preferably provided with an inwardly extending flange 46 adapted to be secured to a hub 48 as by screws 50. The hub 48 is secured to a driven shaft 52 in any convenient manner as by splines 54. The driven shaft 52 is axially aligned with the driving shaft 10, and is journalled for rotation in the flywheel 14 through a bushing 56, a thrust bearing 58 being interposed between the hub 48 and the flywheel 14.

The torque converter A is provided with a reaction member 60 preferably interposed between the first and second stage turbine members 32 and 34. The outer shell 62 of the reaction member is secured as by screws 64 to the flange of a hub 66 which in turn is secured as by welding 68 to a sleeve 70, the forward end of which is centrally positioned on the driven shaft 52 as by the bearing 72. A hub 74 secured to the rear end of the sleeve 70 as by splines 76 is connected to a stationary member 78 by a one-way clutch 80. The stationary member 78 is secured as by screws 82 to the rear end 84 of a housing 86 surrounding the torque converter A as illustrated.

The reaction member 60 is restrained from rotating in the backward direction in the fluid circuit by the one-way clutch 80 when backwardly directed forces are exerted thereon by the circulating fluid when the device is operating to transmit power with increased torque at reduced speed. The reaction member 60 and sleeve 70 rotate in the forward direction on the one-way clutch 80 when the device is operating as a fluid coupling to transmit torque from the driving member 10 to the driven shaft 52 with no multiplication of torque.

A mechanical clutch B is employed to provide a drive in parallel with the torque converter A. The clutch B is interposed between the driving member 10 and the driven shaft 52 to, in effect, interconnect the impeller and turbine members thereby interrupting the operation of the torque converter A to transmit torque directly from the driving shaft 10 to the driven shaft 52 at a 1 to 1 speed ratio.

The mechanical clutch B includes a driving member 88 mounted through splines 90 in a cylindrical portion of the flywheel 14. The driving member 88 is restrained against rearward axial movement by a snap ring 92. The mechanical clutch B includes a disk 94 operably connected to the hub 48 through a resilient coupling such as a plurality of coiled springs 96 positioned in circumferentially extending slots formed between a flange 98 carried by the hub 48 and the disk 94, a disk 100 being secured to the disk 94 as by rivets, and having similarly disposed slots to balance the driving forces exerted on the springs 96.

The disk 94 may be provided with friction surfaces 102 adapted to be clutched to the driving member 88 and to an auxiliary driving disk 104 axially movable on the splines 90 of the cylindrical portion of the flywheel 14. A ring type piston 106 slidably mounted in a cylinder 108 is provided to move the disk 104 rearwardly to engage the clutch B positioned in parallel with the torque converter A.

When the clutch B is engaged torque is transmitted directly from the driving shaft 10 to the driven shaft 52 thereby mechanically interconnecting the impeller and turbine members 18 and 32 and rendering the torque converter A inoperable except as a flywheel. Radially expanding seals 110 and 112 carried by the piston 106, and the flywheel 14 are provided to prevent the escape of hydraulic fluid from the clutch engaging cylinder 108.

Fluid may be transmitted to the cylinder 108 to actuate the piston 106 through passages 114 in the flywheel 14 communicating through a series of interconnected passageways with a pressure gallery subjected to fluid pressure from a pump having an impeller 116 driven through splines 118 by a sleeve 120 having a flange 122 connected as by screws 124 to an inwardly directed flange 126 of the impeller web 20. It will of course be apparent that to permit the engine to be started by pushing the vehicle, a second pump may be driven by a driven shaft such as the shaft 52. These pumps may be connected to a common fluid pressure supply gallery if desired.

In an effort to simplify the disclosure of our invention, a source of fluid pressure is illustrated diagrammatically at P. It will of course be apparent that this source of fluid pressure may emanate from one or more pumps as stated above, and that it may be under constant pressure, or the pressure may vary in any desired manner as in accordance with variations of the speed or torque developed by the engine or in accordance with variations in the speed of a driven shaft or of the vehicle. In the example illustrated the source of fluid pressure P develops substantially constant pressure of the order of 80 to 90 p. s. i.

Also to simplify the illustration of our invention the cylinder 108 of the direct drive clutch B is illustrated diagrammatically as being connected through the passages 114 in the flywheel 14 and a conduit 130 with the cylinder 132 of a combined direct drive shift valve C and a modulating valve D.

The direct drive shift valve C and the modulating valve D have a common cylinder 132 of constant diameter. The direct drive shift valve C and the modulating valve D have spaced plungers 134 and 136 respectively slidably mounted in the cylinder 132, a stop 138 extending across the cylinder 132 to limit movement of the plungers in opposite directions.

The plunger 134 of the direct drive shift valve C is movable toward the left from a clutch disengaging position illustrated in Fig. 1 to a clutch engaging position. Fluid pressure to urge the plunger 134 toward the clutch engaging position is provided by a governor E having a conduit 140 communicating with the source of fluid pressure P. The governor has a gear 142 driven by a driven shaft such as the shaft 52 to supply fluid pressure proportionate to vehicle speed through a conduit 144 to the right-hand end of the cylinder 132. In the example illustrated the governor E is calibrated to deliver fluid pressure ranging from 31 to 61 p. s. i. to the plunger 134 of the direct drive shift valve C at vehicle speeds of 15 to 55 M. P. H. respectively.

Movement of the plunger 134 toward the left to the direct drive position is opposed by fluid pressure exerted in a chamber 146 between the plungers 134 and 136 of the direct drive valve C and the modulating valve D. The pressure exerted in the chamber 146 emanates from an accelerator pedal actuated valve F, and is proportionate to the speed increasing position of an accelerator pedal 148. In the example illustrated this pressure ranges from approximately 26 to 58 p. s. i.

The accelerator pedal actuated valve F has a cylinder 150 communicating through a conduit 152 with the source of fluid pressure P. A plunger 154 slidably mounted in the cylinder 150 is connected through a linkage 156 with the accelerator pedal 148 which also actuates a throttle valve 158 through a linkage 160.

A sleeve 162 is slidably mounted on the plunger 154 and is yieldingly urged by a spring 164 toward the left-hand position to increase communication between fluid inlet ports 166 in the sleeve 162 and a section 168 of reduced diameter of the plunger 154 which communicates through ports 170 in the sleeve 162 with a section 172 of reduced diameter of the sleeve 162. An abutment in the form of a sleeve 173 is secured in the end of the cylinder 150. The section of reduced diameter 172 of the sleeve 162 is connected through a conduit 174 with the chamber 146 of the cylinder 132 between the direct drive shift valve C and the modulating valve D.

In the operation of the accelerator pedal actuated valve F it will be noted that as the accelerator pedal 148 is moved in the engine speed increasing direction the throttle valve 158 is moved in the clockwise direction and the plunger 154 is moved toward the right to increase the communication between the fluid inlet ports 166 and the section of reduced diameter 168 of the plunger 154. Fluid admitted from the pump P flows through the ports 170 to the section of reduced diameter 172 of the sleeve 162 and urges the sleeve to move toward the right in opposition to the spring 164 to reduce communication between the inlet conduit 152 and the section 168 of reduced diameter of the plunger 154. It will thus be apparent that for every position of the accelerator pedal 148 the valve F develops a proportionate fluid pressure and exerts it through the conduit 174 to the chamber 146 of the direct drive shift valve C and the modulating valve D.

Fluid pressure to actuate the direct drive clutch B is supplied by the modulating valve D, and is preferably proportionate to the speed increasing position of the accelerator pedal 148 but of a higher order than the pressure supplied by the accelerator pedal actuated valve F, such for example as ranging from 40 to 85 p. s. i. It will be noted that the source of fluid pressure P communicates through a conduit 176 with the cylinder 132 of the modulating valve D. The plunger 136 is provided with a section 178 of reduced diameter communicating through ports 180 with an elongated cylinder 182 formed in the plunger 136. A vent valve 184 having a projection 186 adapted to engage a stop member 188 in the cylinder 132 is slidably mounted in the plunger 136 to trap fluid in the cylinder 182, thereby exerting a force urging the plunger 136 toward the right in opposition to fluid pressure from the accelerator pedal actuated valve F exerted in the chamber 146. Since the pressure admitted to the cylindrical chamber 182 through the ports 180 emanates from the source of fluid pressure P and is therefore of a higher order than the pressure exerted in the chamber 146 from the accelerator pedal actuated valve F, the plunger 136 will be shifted to the right to reduce communication between the conduit 176 communicating with the source of fluid pressure P and the section of reduced diameter 178 of the plunger 136. A resultant pressure is thus maintained in the section 178 of reduced diameter which is proportionate to the speed increasing position of the accelerator pedal 148 but of a higher order than the pressure exerted in the chamber 146 from the accelerator pedal actuated valve F. This pressure is employed to actuate the direct drive clutch B and it is directed through the conduits 190, 192 and 194 to the cylinder 132 of the direct drive shift valve C adjacent the conduit 130 from the direct drive clutch B.

The plunger 134 of the direct drive shift valve C has a section 196 of reduced diameter proportioned in such a manner that when the plunger 134 is in the right-hand position the conduit 130 from the direct drive clutch B communicates with a vent passage 198 in the cylinder 132 as illustrated to release the direct drive clutch.

When operating under cold weather conditions the fluid delivered by the source P flows more slowly when the engine is started than it does after the device has been in operation for a sufficient length of time for the fluid to become heated. When the direct drive clutch B is engaged by fluid pressure under relatively low temperature such for example as below 40° F. the engagement of the clutch may be slower than is desired. When under low temperature conditions the direct drive clutch B is to be released as to stop the vehicle the clutch does not readily release whereupon frequent stalling of the engine ensues. Difficulties are also encountered when it is desired to release the direct drive clutch and reengage the torque converter to accelerate the vehicle because rapid acceleration cannot be had through the torque converter until the direct drive clutch is fully released.

Means in the form of a temperature responsive valve F are interposed between the governor E and the direct drive shift valve C to vent fluid from the governor E thereby preventing sufficient fluid pressure from being exerted on the right-hand end of the plunger 134 to move it to the position to engage the direct drive clutch B until the oil is heated to a sufficient degree to insure satisfactory engagement and disengagement of the clutch.

The temperature responsive valve consists of a housing 230 secured to the right-hand end of the body having the cylinder 132 of the direct drive shift valve C, and having a chamber 232 communicating with the cylinder 132 through ports 234. A temperature responsive element 236 in the form of a bi-metallic disk is adapted to move from a venting position in Fig. 2 to a closed position illustrated in Fig. 1 when subjected to substantially predetermined variations in temperature.

The temperature responsive element 236 is preferably of disk shape and may be formed of any desired metals or alloys having different coefficients of expansion when subjected to variations of temperature. For example it may be formed of an alloy of nickel and steel and another alloy of chrome nickel and steel fused together in any desired manner. The temperature responsive element is preferably bowed somewhat in opposite directions when moved to the clutch operating and venting positions illustrated in Figs. 1 and 2. A snap action is thus insured whereby the engagement of the direct drive clutch is delayed until the temperature of the oil is up to sufficient degree to insure satisfactory disengagement thereof.

The temperature responsive element 236 is of course positioned in chamber 232 and is clamped between the housing 230 and a member 238 secured thereto in any desired manner as by rolling a bead 240 of the housing 230 over the edge of the member 238 as illustrated. The member 238 preferably has a centrally disposed port 242 adapted to be closed by a flat faced valve 244 carried by the temperature responsive element 236 as illustrated in Fig. 1 when the temperature responsive element is subjected to substantially predetermined temperature such for example as temperature of the order of 65° F. or over. The temperature responsive element 236 is provided with ports 246 to permit the flow of fluid from the conduit 140 through the port 234, ports 246 in the temperature responsive element 236 and out the port 240 when the temperature responsive element is in the venting position as illustrated in Fig. 2. A metering pin 248 is positioned between the conduit 144 and the end of the direct drive shift valve C to calibrate the quantity of fluid admitted to the direct drive shift valve from the governor E. The restriction to fluid flow caused by the metering pin 248 is sufficient when the element 236 is in the venting position illustrated in Fig. 2 that it is impossible for the fluid from the governor E to exert sufficient force on the right hand end of the plunger 134 to shift it to the position to engage the direct drive clutch B.

The operation is as follows. With the engine running at idling speed the throttle valve 158 is maintained in the idling position whereupon relatively low fluid pressure, of the order of 26 pounds per square inch is exerted in the chamber 146 of the direct drive shift valve C by the accelerator pedal actuated valve F. This pressure urges the plunger 134 of the direct drive shift valve C toward the right-hand position as illustrated in Fig. 1 to vent the direct drive clutch B through the conduit 130, the section of reduced diameter 196 of the plunger 134 and the vent passage 198.

As the engine is accelerated the impeller 18 of the torque converter energizes fluid and directs it to the turbine members 32 and 34 to drive the driven shaft 52, the reaction member 60 of the torque converter being locked against reverse rotation by the one-way clutch 80 to redirect the fluid to transmit power from the driving shaft 10 to the driven shaft 52 with an increase of torque.

At vehicle speeds between approximately 15 to 55 M. P. H. the governor E driven by a driven shaft such as the shaft 52 reduces fluid pressure from the source P, and directs progressively increasing pressure ranging from approximately 31 to 61 p. s. i. through the conduit 144 to urge the plunger 134 of the direct drive shift valve C toward the left-hand position in opposition to the pressure ranging from 26 to 58 p. s. i. exerted on the left-hand end of the plunger 134 in the chamber 146 from the accelerator actuated valve F. As the governor pressure overcomes the pressure from the accelerator pedal actuated valve, the plunger 134 including the piston 202, the sleeve 210 and the spacer member 212 are progressively shifted toward the left. When the plunger 134 shifts far enough to the left that the section of reduced diameter 196 communicates with the conduit 194 from the modulating valve D fluid ranging in pressure from 40 to 85 p. s. i. in the example illustrated is directed to the direct drive clutch B to engage it.

The vehicle speed at which the direct drive clutch B will engage is dependent upon the position of the accelerator pedal and the speed of the driven shaft or the vehicle speed. For light throttle opening position of the accelerator pedal, the direct drive clutch B will engage at relatively slow vehicle speed, and for heavier positions of the accelerator pedal the engagement of the clutch will occur at higher vehicle speeds. It will also be apparent that the engagement of the clutch with the same throttle setting position of the accelerator pedal does not necessarily occur at the same vehicle speed because of the influence of the road conditions over which the vehicle is travelling, such for example as when going up or down hill.

When operating under low temperature conditions such that the temperature of the oil supplied by the pump P and the governor E is less than approximately 40° F. the temperature responsive element 236 of the valve F is moved to the venting position illustrated in Fig. 2. The engagement of the direct drive clutch B is then delayed because of the impossibility of subjecting the plunger 134 of the direct drive shift valve C to sufficient pressure from the governor E to move it to the clutch engaging position. The torque converter A thus functions to interconnect the driving shaft 10 and the driven shaft 52 in such a manner that ample power is available for acceleration of the vehicle, and the engine is permitted to rotate at a sufficiently high speed that there is little danger of stalling it.

Since the fluid supplied by the pump P is utilized in the transmission of torque from the driving shaft 10 to the driven shaft 52 the fluid is heated rather rapidly. The temperature responsive element 236 of the valve F is bathed in oil supplied by the governor E because there is a continuous flow of oil through the element 236 from the conduit 144, ports 234, 246 to the port 242 at vehicle speeds above approximately 15 M. P. H. The temperature responsive element 236 thus rather closely approximates the temperature of the oil when it is in the venting position. When the thermostat is heated to a temperature of approximately 65° F. it moves by a snap action to the position illustrated in Fig. 1 whereupon the flat faced valve 244 closes the port 242 thereby preventing the escape of fluid and subjecting the right-hand end of the plunger 134 of the direct drive shift valve C to fluid pressure as described above to shift the plunger toward the left to engage the direct drive clutch B.

It is thus possible to engage the direct drive clutch B only when the temperature of the operating fluid is sufficiently high to insure proper engagement and disengagement of the clutch. More satisfactory operation is thus insured.

While the invention has been illustrated with reference to a particular embodiment it will be understood that various changes may be made without departing from the spirit of our invention.

We claim:

1. In a transmission having driving and driven shafts for an accelerator pedal controlled engine, a torque converter interconnecting said shafts, a direct drive clutch in parallel with the torque converter, a source of fluid pressure, fluid pressure operated means to engage the direct drive clutch, a direct drive shift valve having an axially movable plunger controlling the engagement of the direct drive clutch, a governor to exert on one end of the plunger of the direct drive shift valve a fluid pressure force proportionate to the speed of the driven shaft urging said plunger toward the direct drive position, means defining a fluid pressure relief mechanism between the governor and the direct drive shift valve, an accelerator pedal actuated valve to exert on the opposite end of the plunger of the direct drive shift valve a force proportionate to the position of the accelerator pedal opposing movement of said plunger toward the clutch engaging position, temperature responsive means controlling the fluid pressure relief mechanism, and said responsive means including a snap acting means adapted to fully open or close said relief mechanism depending upon the temperature setting of said thermoresponsive means.

2. In a control mechanism for a direct drive clutch between driving and driven shafts, a source of fluid pressure, fluid pressure operated means to engage said clutch, a valve controlling the engagement of said clutch, a governor to exert on the direct drive shift valve a fluid pressure force proportionate to the speed of the driven shaft urging said valve toward the clutch engaging position, an accelerator pedal actuated valve to exert on the opposite end of said valve an opposing force proportionate to the position of the accelerator pedal, and temperature responsive venting means between the governor and said valve to interrupt the exertion of fluid pressure on the valve when the temperature of the fluid is below a substantially predetermined temperature, said temperature responsive means including a snap acting means adapted to fully open or close the vent.

3. In a transmission having driving and driven shafts for an accelerator pedal controlled engine, a torque increasing drive interconnecting said shafts, a direct drive clutch in parallel with the torque increasing drive, a source of fluid pressure, fluid pressure operated means to engage the direct drive clutch, a direct drive shift valve including an axially movable plunger shiftable from a clutch disengaging position to a clutch engaging position, a governor to exert on one end of the plunger of the direct drive shift valve a force proportionate to the speed of the driven shaft urging said plunger toward the clutch engaging position, an accelerator pedal actuated valve to exert on the opposite end of said plunger an opposing force proportionate to the position of the accelerator pedal, and snap acting temperature responsive means to interrupt communication between the governor and the direct drive shift valve when the temperature of the fluid is below a substantially predetermined degree while conditioning the shift valve for normal operation when the temperature is above said degree.

4. In a transmission having driving and driven shafts, a torque increasing drive interconnecting said shafts, a direct drive clutch in parallel with the torque increasing drive, a source of fluid pressure, fluid pressure operated means to engage the direct drive clutch, a direct drive shift valve including an axially movable plunger shiftable from a clutch disengaging position to a clutch engaging position, means to exert a force on one end of the plunger of the direct drive shift valve urging said plunger toward the clutch engaging position, means to exert on the opposite end of said plunger an opposing force, and snap acting temperature responsive means to interrupt the exertion of force urging the plunger of the direct drive shift valve toward the clutch engaging position while the temperature of the fluid is below a substantially predetermined degree while conditioning the shift valve for normal operation when the temperature is above said degree.

5. In a control mechanism for a direct drive clutch between driving and driven shafts, a source of fluid pressure, fluid pressure operated means to engage said clutch, a valve controlling the engagement of said clutch, an axially movable plunger slidably mounted in a cylinder of said valve and movable from a clutch disengaging position to a clutch engaging position, means to exert a force on one end of the plunger of the direct drive shift valve, means to exert an opposing force on the opposite end of said plunger, and snap acting temperature responsive means to interrupt the exertion of force urging the plunger of the direct drive shift valve toward the clutch engaging position while the temperature of the fluid is below a substantially predetermined degree while conditioning the shift valve for normal operation when the temperature is above said degree.

6. In a transmission having driving and driven shafts for an accelerator pedal controlled engine, a high torque ratio drive interconnecting said shafts, a lower torque ratio drive including a clutch in parallel with the high torque ratio drive, a source of fluid pressure, fluid pressure operated means to engage said clutch, a valve controlling the engagement of said clutch and including an axially movable plunger, means to exert on one end of the plunger of said valve a force proportionate to the speed of the driven shaft urging said plunger toward the clutch engaging position, means to exert on the opposite end of the plunger of said valve a force opposing movement of said plunger toward the clutch engaging position, and snap acting temperature responsive means to delay engagement of the direct drive clutch until the temperature of the fluid attains a substantially predetermined degree while conditioning the shift valve for normal operation when the temperature is above said degree.

7. In a control mechanism for a friction device controlling a drive between driving and driven shafts, a source of fluid pressure, fluid pressure operated means to engage said friction device, a valve controlling the engagement of said friction device, an axially movable plunger slidably mounted in a cylinder of said valve and movable from a disengaging position to an engaging position, means to exert a force on one end of the plunger of the direct drive shift valve urging it toward the position to engage the friction device, means to exert an opposing force on the opposite end of said plunger, and snap acting temperature responsive means to delay the exertion of force urging the plunger toward the position to engage the friction device until the temperature of fluid to engage said friction device reaches a substantially predetermined degree while conditioning the shift valve for normal operation when the temperature is above said degree.

8. In a transmission, the combination of a fluid torque converter, a fluid means for operating a direct drive clutch, conduit means for interconnecting a source of fluid pressure with said fluid operating means and said converter, means in said conduit to control the flow of fluid therethrough to said fluid operating means, and temperature responsive means delaying operation of the fluid means for operating the switch until the converter has heated the operating fluid to a free flowing temperature, said temperature responsive means including snap acting means adapted to render operative said means to effect control of the flow of fluid through the conduit leading to said clutch operating means after the operating fluid has reached a free flowing temperature.

9. In a transmission having driving and driven shafts, a high torque ratio drive interconnecting said shafts, a lower torque ratio drive interconnecting said shafts, a hydraulic system including a source of fluid pressure, fluid pressure operated means to engage the lower torque ratio drive, a conduit leading from said source of fluid pressure to said fluid operated means, and snap acting temperature responsive means cooperatively associated with said conduit to delay the engagement of the lower torque ratio drive while the temperature of the fluid remains below a substantially predetermined degree while conditioning said system for normal operation when the temperature of said fluid is above said degree.

10. In a transmission, the combination of a fluid torque converter, a fluid means for operating a direct drive clutch, a source of fluid pressure, a conduit leading to the clutch operating means, a valve in said conduit, and snap acting temperature responsive means cooperating with the valve, said temperature responsive means being operative when the temperature of the fluid in said conduit rises above a predetermined degree to condition said valve for opening to admit pressure to said fluid means for normal operation of the direct drive clutch.

11. In a control mechanism for engaging a clutch device for transmitting power from a driving to a driven shaft, a hydraulic system including a source of fluid pressure, fluid pressure operated means to engage said clutch device, conduit means leading from said source of fluid pressure to said means to engage said clutch device, means acting upon the hydraulic fluid which heat it, snap acting temperature responsive means operatively associated with said conduit, said temperature responsive means including means for cutting off the flow of cold fluid to said fluid pressure operated means, and said temperature responsive means being operative to permit heated fluid to flow to said fluid pressure operated means when the temperature of said fluid is above the actuating setting of the temperature responsive means to condition said hydraulic system for normal operation.

HERBERT L. MISCH.
CARROLL J. LUCIA.

REFERENCES CITED

The following references are of record in the file of this patent:

UNITED STATES PATENTS

| Number | Name | Date |
|---|---|---|
| 2,230,777 | Hey | Feb. 4, 1941 |
| 2,241,334 | Stucatur | May 6, 1941 |
| 2,372,817 | Dodge | Apr. 3, 1945 |
| 2,404,623 | Dodge | July 23, 1946 |
| 2,446,730 | Wemp | Aug. 10, 1948 |

OTHER REFERENCES

Packard Serviceman's Training Book, Packard Motor Car Company, Detroit, Michigan 1949.